United States Patent [19]
Schuell

[11] 3,897,704
[45] Aug. 5, 1975

[54] THREAD CUTTING ATTACHMENT

[76] Inventor: Joseph Schuell, 1802 Summit Ter., Linden, N.J. 07036

[22] Filed: Jan. 31, 1974

[21] Appl. No.: 438,284

[52] U.S. Cl. .................................................. 82/5
[51] Int. Cl. ............................................. B23b 1/00
[58] Field of Search ............................... 82/5, 5.5

[56] References Cited
UNITED STATES PATENTS

| 293,930 | 2/1884 | Woerd | 82/5 |
|---|---|---|---|
| 1,159,739 | 11/1915 | Bock | 82/5 X |
| 1,955,658 | 4/1934 | Rodde et al. | 82/5 X |
| 2,396,631 | 3/1946 | Andreson | 82/5 X |
| 2,533,254 | 12/1950 | Whigam | 82/5 |

FOREIGN PATENTS OR APPLICATIONS

| 504,752 | 4/1920 | France | 82/5.5 |
|---|---|---|---|
| 997,929 | 9/1951 | France | 82/5.5 |
| 354,311 | 6/1961 | Switzerland | 82/5 |

*Primary Examiner*—Harrison L. Hinson

[57] ABSTRACT

A thread cutting attachment for lathes is disclosed for milling a wide variety of threads on workpieces using a master threading bar axially aligned and synchronously driven with the workpiece. The device is readily attachable to an ordinary lathe. It comprises a master threaded arbor adapted to be held in the chuck of the lathe headstock and a cutting assembly guided on the compound rest of the lathe. This assembly comprises a base plate slideably mounted on a base member and a master thread bar follower nut affixed to the base plate to drive the assembly along the longitudinal axis of the lathe toward and away from the tailstock. The workpiece is axially secured between the threading bar and the chuck of the tailstock, and the cutter is mounted on the base plate and readily engaged therefrom with the workpiece. An automatically retractable tool post is also disclosed.

4 Claims, 9 Drawing Figures

RIGHT HAND
CUTTING
THREAD

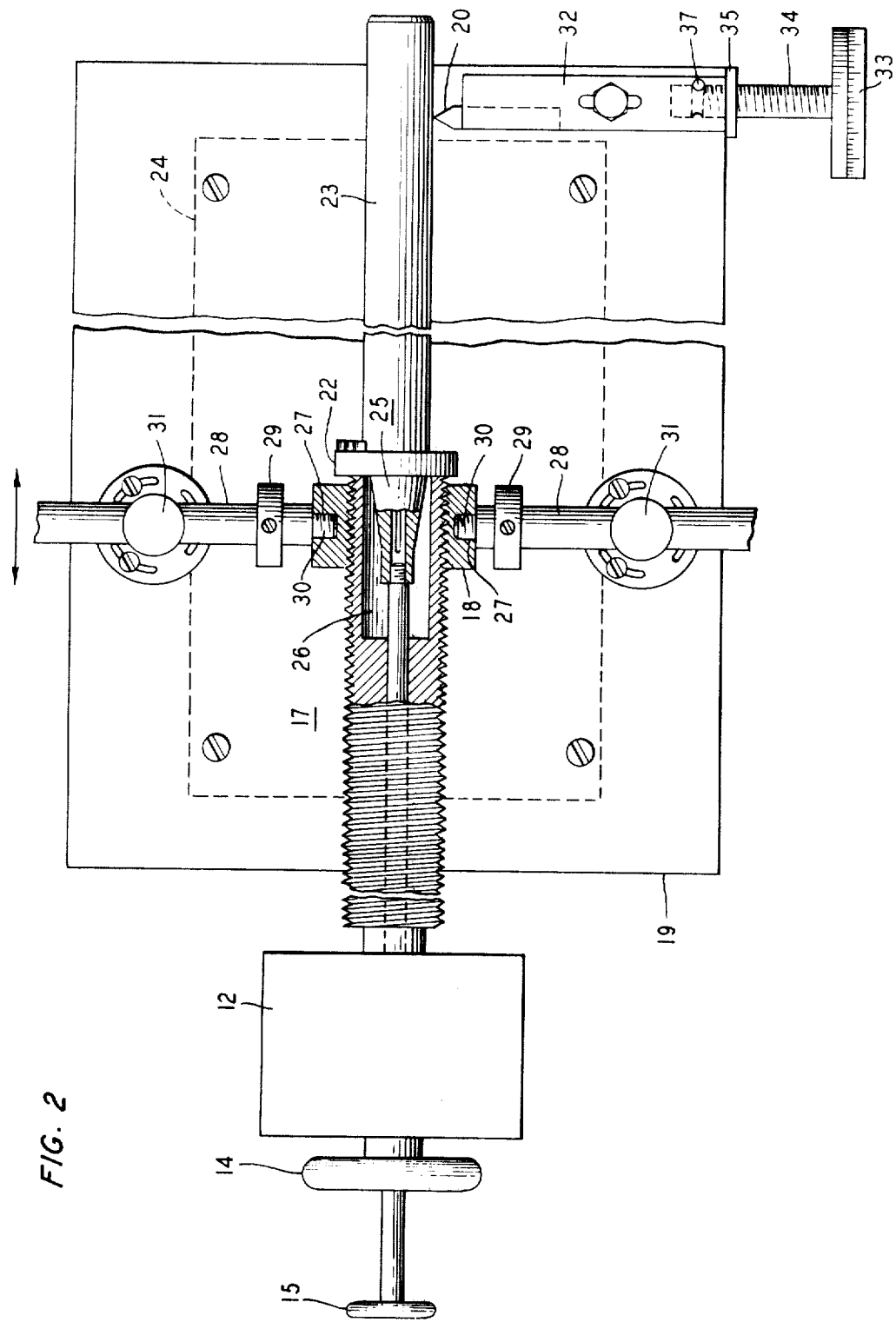

3,897,704

PATENTED AUG 5 1975   SHEET 4

LEFT HAND
CUTTING THREAD

THREAD CUTTING ATTACHMENT

This invention relates to metal turning lathes and, more particularly to a thread cutting attachment which embodies a calibrated thread cutting guide independent of the conventional integrated lathe thread cutter gear systems.

The metric system soon to be a measurement standard in the United States will be an important step in joining the European technology with that of the United States. This change, however, presents a major problem for users of existing equipment geared to a measurement system soon to be obsolete. The problem is more acute when one considers the expense of converting an engine lathe to metrics.

Thus it is a principal object of the invention to provide an attachment device for engine lathes that permits total flexibility in cutting threads while it is independent of the conventional integrated thread cutting mechanism of a lathe.

It is a further object of this invention to furnish a thread cutting device which installs between the headstock and tailstock of a lathe and contains a calibrated thread cutter arrangement actuated solely by the rotation of the lathe.

It is a more particular object of this invention to furnish an interchangeable metric thread cutter held in the rotating chuck of a lathe and moveable sideways to duplicate the master thread on an axially aligned rotating workpiece.

Still another object of the invention is to provide a thread milling attachment of the above-described type which mills right and lefthand threads with the same accuracy, and fully down to a shoulder or to the bottom of a blind hole.

It is yet another object to furnish a thread cutter of the type above with an automatic retractor to disenage the workpiece and cutter tool.

These objects, as well as others, are provided by this invention which essentially comprises an interchangeable master thread arbor adapted to be held in a headstock chuck and which includes a chuck and collet attachment at one end. A workpiece is secured between the latter chuck and the usual tailstock chuck. A master thread bar follower nut is threaded onto the thread arbor and carries a cutter base plate constrained to move sideways as the lathe rotates. Advantageously, no auxiliary motors are required and the rotation of the lathe chuck provides all the necessary drive. Also, the thread arbor and follower nut, which are readily interchangeable, form master cutter guides eliminating the necessity to use the integrated thread cutter guide of the lathe.

The features and advantages of this invention will become more apparent from a reading of the ensuing detailed specification when considered together with the accompanying drawing. In the drawing:

FIG. 2 is a plan view of the thread cutter showing in a partial cut-away and sectional view the manner of holding a workpiece at the master thread arbor collet;

DETAILED DESCRIPTION

My thread cutting attachment for a lathe is disclosed for cutting or chasing threads of all varieties on a workpiece using a master thread bar without the conventional gear train designed to cut threads. The master thread bar is axially aligned and synchronously drives the workpiece. The device is attachable to any lathe. A thread cutting gear train and feeding lead screw are not required. The attachment comprises a master thread arbor to be held in the chuck or collet of the lathe headstock or spindle. The workpiece to be threaded is clamped or held on the end of the master thread arbor by means of a chuck or collet and aligned by the center of the tailstock. On inside threads the tailstock center cannot be used. Normally for cutting inside threads the workpiece is short, but if long, a steady rest guiding long work for inside cutting may be used. My attachment is assembled to the compound rest or the crossslide of the lathe bed. The assembly comprises a base plate attached to a linear table assembly fitted with ball or roller bearings to minimize friction. This assembly comprises a base plate mounted on a sliding base linear table not affixed to the base plate but slidably mounted is a master thread bar follower nut traveling longitudinally and horizontally on the master thread bar exerting linear motion onto the base assembly by means of a front and a back guide rods sliding in a front and back bushing for stabilization and alignment to drive the attachment along a longitudinal axis in either direction. The workpiece is axially secured between the chuck or collet on one end of the master thread bar and the center of the lathe tailstock. The cutting tool or chaser is held in a tool post or tool holder. The tool post is mounted on the base plate. An automatically retractable tool holder, to be interchangeable with the conventional tool holder, is also disclosed.

As the main spindle in the headstock turns, the master thread bar rotates with it and so turns the workpiece to be threaded. As the master thread bar turns, it advances the master thread bar follower nut, which exerts a linear motion to the base plate upon which the cutting tool is assembled and set to cut the required thread (the same thread as on the master thread bar) on the workpiece.

It should be particularly noted that the outside diameter of the master thread bar and the diameter of the workpiece are each independent. Only the diameter of the workpiece is standard to the screw thread to be cut.

Figure 1:
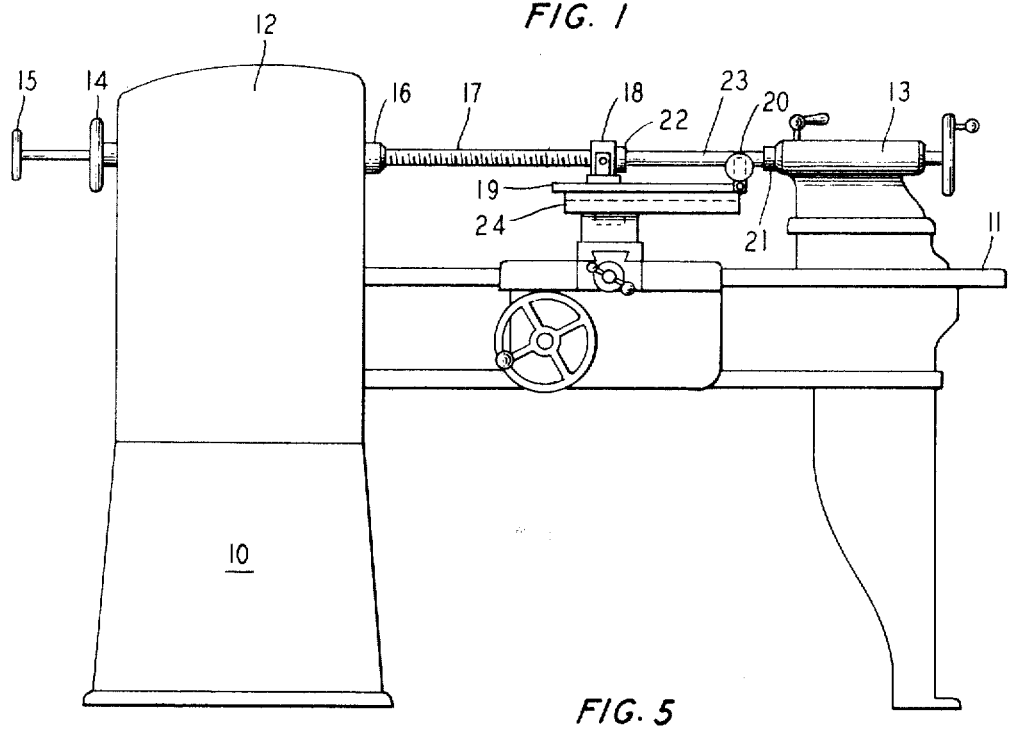
FIG. 1 is a front view of a conventional lathe showing the thread cutting attachment embodying the invention attached to the engine lathe as well as a workpiece in the position for thread cutting.

Referring now in detail to drawing FIG. 1, there is shown a lathe 10 having a conventional bed 11, headstock 12 and tailstock 13. To the left side of the Figure is shown a main draw back bar 15 in axial alignment with headstock chuck 16. FIG. 1 importantly shows the thread cutter arrangement of this invention which includes a master threading bar 17, follower nut 18 engaging the external threads of bar 17, a base plate 19 affixed to nut 18 as will be explained hereinafter and cutter 20. It is to be noted that although I have chosen a conventional lathe to teach my invention, I do not require a gear train or the usual lead screw. As explained hereinafter, I use only the headstock spindle, the cross slide mounted on the lathe bed, the tailstock and the draw back collet to hold the master thread rod.

The workpiece (e.g., piece 23) is held by lathe tailstock chuck 21 and collet chuck 22 which is part of threading bar 17. Thus, workpiece 23 is rotated at the same time threading bar 17 is rotated in headstock 12. Included as part of the cutter arrangement also is slide 24 upon which plate 19 is slidably mounted. Thus as bar 17 is rotated, a sideways motion is imparted to plate 19 and, importantly, to cutter 20 which cuts the thread profile of the master bar 17 onto the workpiece.

These Figures also serve to clearly depict cutting tool 20 and tool post 32 with its adjustment section comprising calibrated wheel 33, threaded member 34 and threaded rest 35. Inasmuch as the tool post is fairly conventional, it is not considered in greater detail herein. However, it is to be recalled that base plate 19 moves in the direction indicated by arrowheads in FIG. 2 (depending upon the rotating direction of the headstock), and tool post 32 also moves in the same direction at the same rate.

My invention can be used on bench lathes which are not equipped with thread cutting facilities. In addition, it can be used on lathes equipped with gears for thread cutting but lacking the desired screw pitch or convention.

An important aspect of this invention is the versatility of the arrangement which permits thread guides to be interchanged with ease. A master thread set comprises a master threading bar and follower nut (e.g., bar 17 and 18). To change a master set one loosens the collect attachment chuck, e.g., chuck 22 and the headstock chuck, e.g., chuck 16. This frees the master threading bar. Next the follower nut guide rods 28 are rotated to disengage the rods from the follower nut. This last action entirely frees the master thread set, and it can be removed and replaced by a different set of thread guides. It is important to note that although the exemplary embodiment discloses a thread cutter guide, other guides with helical cuts, etc., may be developed and such improvements are considered to be within the scope of this invention.

Figure 3:
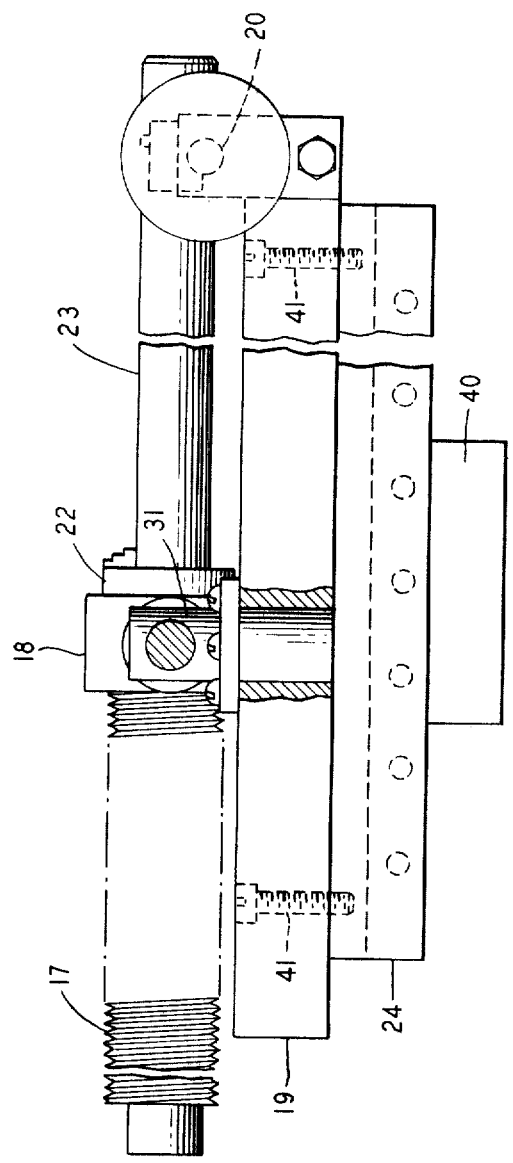
FIG. 3 is a side view of the cutter arrangement.

FIG. 3 shows most clearly the slide plate 24 under base plate 19. Slide plate 24 is affixed to base plate 19 with four screws 4 inches only two of which can be viewed in FIG. 3. This arrangement permits replacement of slide plate 24 due to wear. Member 40 is added to the conventional and usual compound rest which includes the usual drive spindle mechanism operative to screw turn the rest forwardly or rearwardly, although such operations are not required herein except as part of the initial alignment procedures. Member 40 is also easily replaced due to wear by loosen fixtures in the compound rest. FIG. 3 further serves to depict the fact that posts 31 (only one post shown) penetrates base plate 19 for its full depth to add structural support to each guide rod as it is subjected to cantilevered stresses.

Figure 4:
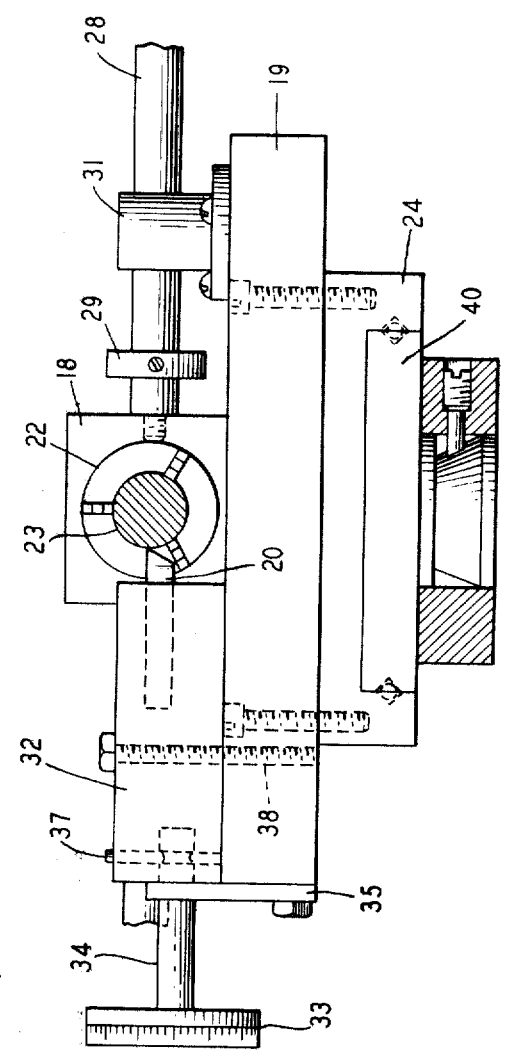
FIG. 4 is an end view of the cutter arrangement as viewed in front of the tailstock.

FIG. 4 serves to clarify the cutting arrangement and, in particular, tool post 32 with its accessories as well as slide plate 24 resting on member 40 with the fastening fixtures. Tool post 32 is fastened to base plate 19 with machine screw 38 as well as an unnumbered end screw through plate 35 and base plate 19.

Figure 5:
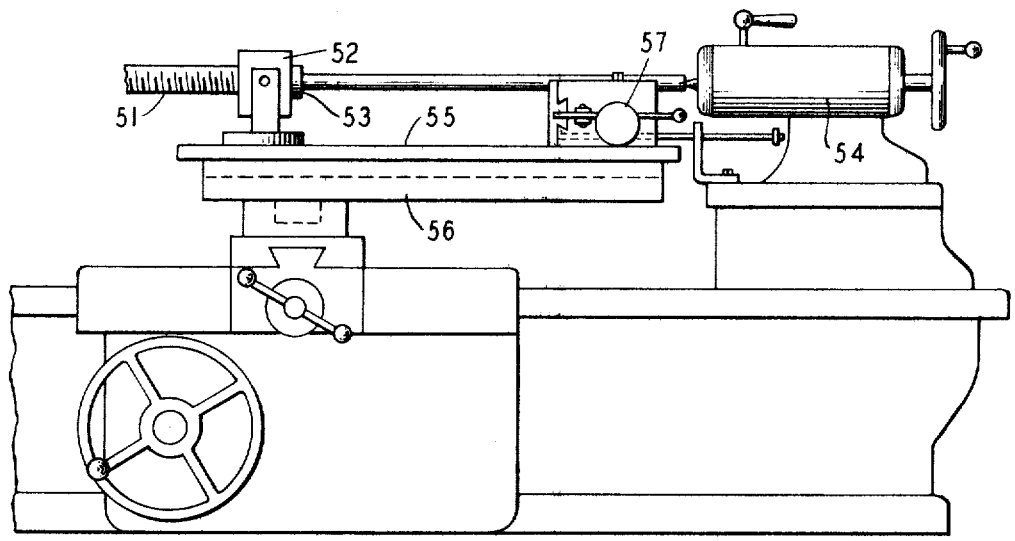
FIG. 5 is a front view of a variation of the cutter arrangement installed on a conventional engine lathe having an automatic retractable tool post.

Turning next to FIG. 5 and the ensuing Figures, there is disclosed an alternative embodiment for the tool cutting post and its accessories. It will be observed that for the most part the assembly shown in FIG. 5 is substantially identical to that of FIG. 1. There is a master threading bar 51 which is rotatably mounted in a lathe headstock (not shown) and a follower nut 52 threaded thereon. As previously described, a collet 53 is provided to hold the workpiece and to couple the rotating drive of threading bar 51 to the workpiece. The opposite end of the workpiece is held in a conventional fashion by tailstock 54.

Follower nut 52 is secured to base plate 55 which is joined to slide plate 56. This coupling furnished the translational sideway forces, which, as will be described, urges the retracting tool assembly sideway at a uniform speed.

Automatic Retracting Cutting Tool Assembly

This entire unit (shown in FIGS. 6 and 7) is one assembly with the exception of release plunger actuator 70 which is clamped to a non-moving portion of the lathe bed or the tailstock. This unit is optional and interchangeable with the conventional tool post No. 32 assembly. As the thread cutting operation proceeds toward the left or the headstock, stop collar 71 is set to the linear distance to be traveled. When the stop collar 71 reaches the release plunger actuator 70, it prevents the release plunger 65 from further advancing with the rest of the unit until the release plunger 65 disengages from the release plunger bushing 67. Then the trigger glide rod 64, which is held tight in the tool post or tool holder 60, is actuated by a trigger spring and slides the tool holder 60 with the cutting tool away from workpiece 22. Then the master thread bar is shifted into reverse by means of the headstock spindle to travel to the right towards the tailstock until cutting tool 20 clears the workpiece. The machine is stopped and then tool post 60 is advanced by hand the desired amount to be cut with the fine adjustment screw graduated hand wheel. Next the reset lever is pulled towards the operator. The reset level is pivoted on a pin in the reset lever bracket. When the reset level 75 is pulled, it resets the tool holder or tool post 60 to the starting position where it is advanced by the fine adjustment screw hand wheel a precise amount in order to take a deeper cut on the workpiece. When all is set, the headstock spindle is made to turn again forward and the cutting action is resumed and repeated until the thread to be cut is complete. Several cuts with the cutting tool may be taken to complete a thread.

Considering the tool in detail, tool post 60 is slidably mounted in tool holder housing 61 and has wedge-shaped protrusions 62 which are housed in a similarly shaped mating section 63 of housing 61. These fitted sections permit tool post 60 to disengage from the workpiece under control of a spring loaded glide rod 64 as will be subsequently discussed. Tool post 60 is locked in position with respect to housing 61 by release plunger 65 which is guided through a cylinder chamber 66 into an aligned chamber 67 equipped with a plunger bushing 68. As base plate 69 moves to the left, release plunger 65 is drawn through a release plunger actuator 70 formed by an angle shaped bracket affixed to the lathe tailstock. When the plunger 65 is drawn to the left sufficiently, stop collar 71 engages actuator 70 and further sideward motion ceases. Thereafter, plunger 65 is withdrawn from housing 61 and from chamber 67 in tool post 60. When fully withdrawn from chamber 67, tool post 60 is driven away from the workpiece under the influence of a trigger spring which will be discussed next.

Figure 6:
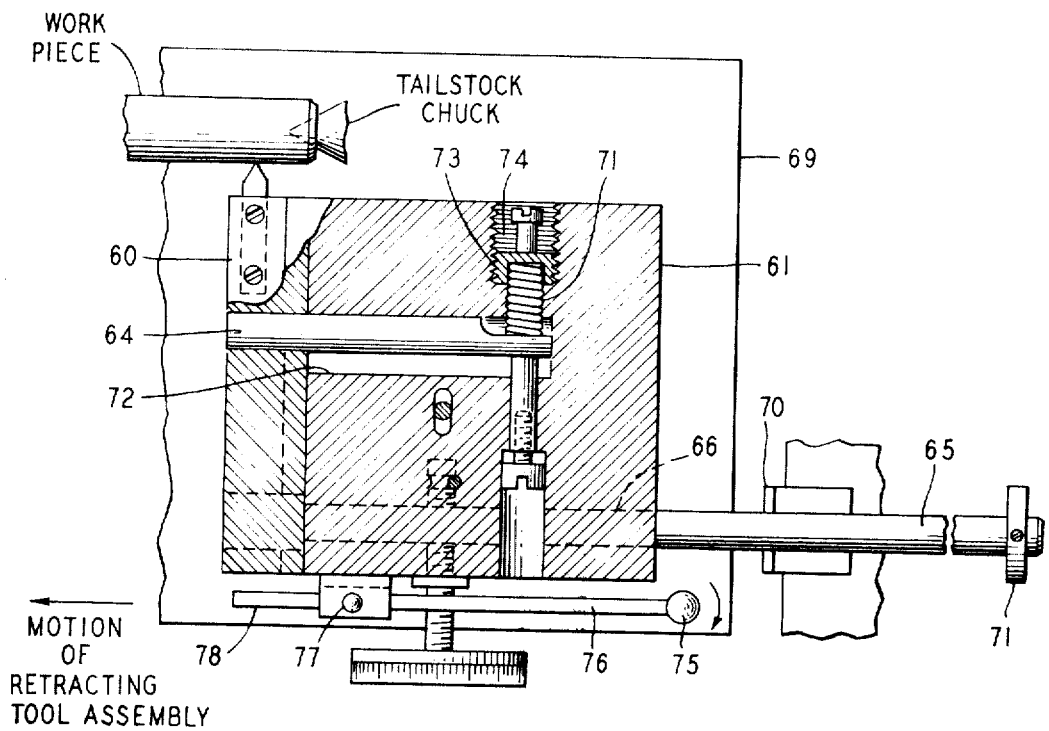
FIGS. 6 and 7 are, respectively, a plan view and front view of a retracting tool arrangement specially designed to work with the threaded arbor and follower nut of the invention.
Figure 7:
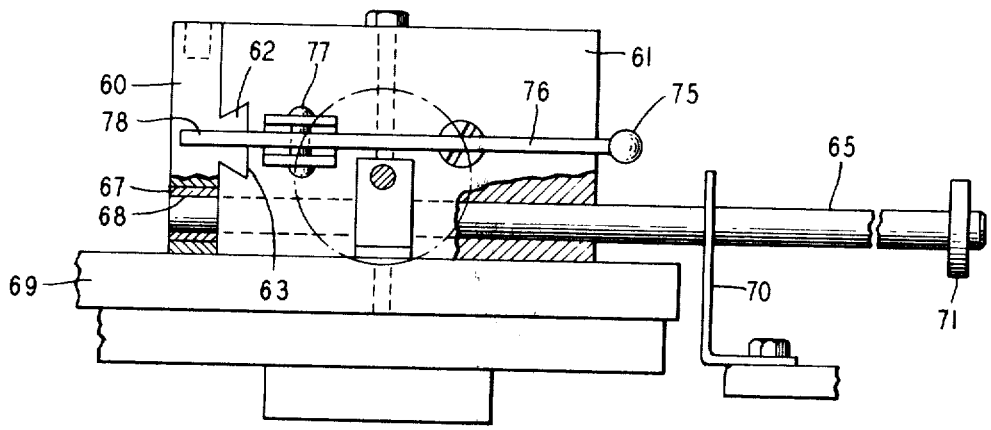

Considering the trigger action in greater detail, rod 64 is lifted into tool post 60 rigidly and extends through an oversized chamber 72. Before the plunger 65 is withdrawn from chamber 68, rod 64 is positioned in chamber 72 as shown in FIG. 6. Rod 64 is under stress because trigger spring 71 is pressing in a cantilever fashion against one end of rod 64. The spring pressure is adjustable by changing the position of trigger spring plug 73 in threaded insert 74. When plunger 65 is withdrawn, glide rod 64 pushes tool post 60 away from the workpiece ending the thread cutting cycle.

Tool post 60 is repositioned for another work cycle with reset lever 75. By pulling arm 76 toward oneself (as viewed in FIG. 7), end member 78 is pivoted on pin 77 into engagement with the back of tool post 60 (touching end member 70 in its disengaged position). When properly aligned, plunger 65 is reinserted into chamber 68 and reset lever 75 is released.

Figure 8A:
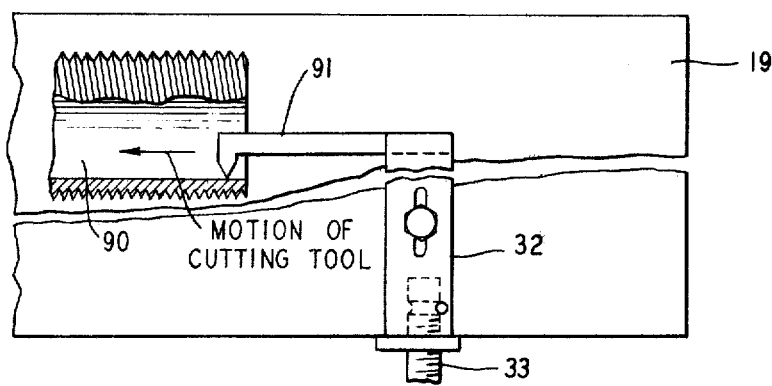
FIGS. 8A and 8B are sectional views of a hollow bore workpiece showing the positioning of the cutter tool to generate a left and righthand thread, respectively.
Figure 8B:
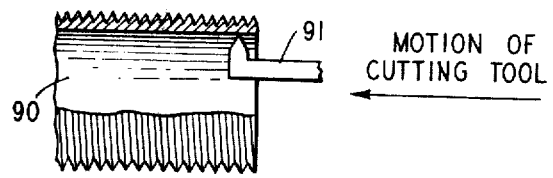

FIGS. 8A and 8B show the manner in which a left and righthand thread can be cut into hollow roundstock---e.g., tube 90. By analogy, one can cut threads similarly on the outside of roundstock (not shown).

FIG. 8A--righthand inside thread: The workpiece 90 is held in a chuck or collet by auxiliary draw back bar 15. The inside diameter may be cut with a fine pitch master thread bar. After finish boring the I.D. in this manner, the master thread bar is replaced by a master thread bar with the correct pitch for the thread to be cut. The thread cutting tool is set square to the end of the tool post. The cutting edge of the cutting tool is face up and the machine is running forwards when cutting.

FIG. 8B--lefthand inside thread: Workpiece 90 is held in the same manner as for cutting righthand inside thread. The cutting tool in tool holder 32 is opposite to the cutting tool for righthand thread. The cutting edge of the lefthand cutting tool is now face down and the machine or master thread bar is running in reverse. The righthand and lefthand cuts, in each instance, are made for left to right. The travel is from left to right, only the rotation of the master thread bar and the position of the face of the cutting tool are opposite.

What is claimed is:

1. A thread cutting arrangement for a lathe comprising a base plate adapted to be mounted directly on a lathe bed or upon a conventional adjustable crossbed slide assembly, a master nut and mating threaded bar cooperating to guide in the formation of a threaded surface upon a rotating workpiece, an adjustable holder on said base plate adapted to hold said master nut and said bar threaded therein and adapted to impart relative motion between said plate and said bar as said bar is rotated while in threaded engagement with said nut, said threaded bar being shaped at one end for retention by the chuck of the lathe headstock and at its opposite end being equipped with an arrangement to retain and rotate an axially aligned workpiece, a tool post holder integral with said base plate to adjustably position a tool in cutting engagement with said workpiece to enscribe a thread pattern thereupon conforming to that of said threaded bar, parallel opposite sides of said nut containing a threaded aperture, and said holder comprises a pair of horizontally disposed glide rods supported above said plate a fixed distance by separate glide rod bearings and from each of said rods at one end thereof and in axial alignment therewith extends a threaded stud adapted to thread into each of said threaded apertures.

2. The invention of claim 1 further including an automatic retractor for disengaging said tool from cutting engagement with said workpiece comprising a plunger actuator mounted on said lathe tailstock having an aperture therein, a plunger rod extending through said aperture having a stop collar thereon, a spring-loaded unit holding said tool in cutting engagement and held in such engagement by said plunger rod, and said unit being adapted to disengage said tool from said workpiece as the tension of said spring relaxes when said actuator contacts said stop collar during the cutting travel of said plate.

3. The invention of claim 1 wherein said arrangement is a collet contiguous with said threaded bar for holding a rotating workpiece in axial alignment.

4. A threaded cutting arrangement adapted to be placed on an existing lathe to provide thereon a means for enscribing a thread pattern upon a cylindrical workpiece, said lathe including a combination lathe bed upon which a conventional adjustable crossbed slide assembly interfits, WHEREIN THE IMPROVEMENT COMPRISES a master nut and mating threaded bar cooperating to guide in the formation of a threaded surface upon rotation of said workpiece, a base plate including thereon an adjustable holder adapted to hold said master nut and said bar threaded therein and adapted to impart relative motion between said plate and said bar as said bar is rotated while in threaded engagement with said nut, said holder includes at least two horizontally disposed glide rods supported above said plate a fixed distance, in axially alignment therewith extending therefrom a threaded fixture, and said nut contains a threaded aperture into which said fixture extends.

* * * * *